(12) United States Patent
Quinlan et al.

(10) Patent No.: US 10,196,143 B2
(45) Date of Patent: Feb. 5, 2019

(54) SYSTEM AND METHOD FOR MODULAR UNMANNED AERIAL SYSTEM

(71) Applicant: The United States of America, as represented by the Administrator of the National Aeronautics and Space Administration, Washington, DC (US)

(72) Inventors: Jesse R. Quinlan, Yorktown, VA (US); Michael D. Patterson, Yorktown, VA (US)

(73) Assignee: THE UNITED STATES OF AMERICA AS REPRESENTED BY THE ADMINISTRATOR OF THE NATIONAL AERONAUTICS AND SPACE ADMINISTRATION, Washington, DC (US)

( * ) Notice: Subject to any disclaimer, the term of this patent is extended or adjusted under 35 U.S.C. 154(b) by 54 days.

(21) Appl. No.: 15/612,206

(22) Filed: Jun. 2, 2017

(65) Prior Publication Data

US 2017/0349281 A1    Dec. 7, 2017

Related U.S. Application Data

(60) Provisional application No. 62/344,728, filed on Jun. 2, 2016.

(51) Int. Cl.
*B64C 39/02* (2006.01)
*B64D 1/12* (2006.01)
(Continued)

(52) U.S. Cl.
CPC .............. *B64C 39/024* (2013.01); *B64C 3/00* (2013.01); *B64D 1/12* (2013.01); *B64C 29/0033* (2013.01);
(Continued)

(58) Field of Classification Search
CPC ... B64C 39/024; B64C 3/00; B64C 2201/021; B64C 2201/102; B64C 2211/00; B64C 2201/126; B64C 2201/128
See application file for complete search history.

(56) References Cited

U.S. PATENT DOCUMENTS 3,640,491 A * 2/1972 Harrison .................. B64C 1/00
                                                        244/117 R
3,669,385 A * 6/1972 Glantz ...................... B64C 1/00
                                                        244/13
(Continued)

OTHER PUBLICATIONS

Pogue, David, "Exclusive Amazon Details About Its Crazy Drone Delivery Program." https://www.yahoo.com/tech/exclusive-amazon-reveals-details-about-1343951725436982.html, Jan. 18, 2016.
(Continued)

*Primary Examiner* — Christopher P Ellis
(74) *Attorney, Agent, or Firm* — Andrea Z. Warmbier; Robin W. Edwards; Mark P. Dvorscak (57) ABSTRACT

A modular Unmanned Aerial System (UAS) has first and second flight configurations, and includes an Unmanned Aerial Vehicle (UAV) parent module and a plurality of UAV child modules. The parent module may have a fuselage, forward and aft wings connected to the fuselage, and a first plurality of flight propulsion devices. The child modules have a corresponding second plurality of flight propulsion devices. Each child module docks wingtip-to-wingtip with the parent module or an adjacent edge of a child module using the docking mechanisms. The child modules undock and separate from the forward wing and each other, and achieve controlled flight independently of the parent module while in the second flight configuration. A method for controlling the modular UAS is also disclosed.

20 Claims, 4 Drawing Sheets

(51) Int. Cl.
*B64C 3/00* (2006.01)
*B64C 29/00* (2006.01)

(52) U.S. Cl.
CPC .. *B64C 2201/021* (2013.01); *B64C 2201/042* (2013.01); *B64C 2201/128* (2013.01); *B64C 2201/162* (2013.01); *B64C 2201/165* (2013.01)

(56) References Cited

U.S. PATENT DOCUMENTS

| | | | | |
|---|---|---|---|---|
| 4,741,497 | A * | 5/1988 | Fox | B64C 39/12 244/117 R |
| 5,975,464 | A * | 11/1999 | Rutan | B64C 39/02 244/118.2 |
| 6,126,113 | A * | 10/2000 | Navickas | B64C 1/06 244/120 |
| 7,237,750 | B2 * | 7/2007 | Chiu | A45C 13/02 244/119 |
| 8,172,172 | B2 | 5/2012 | Gomez et al. | |
| 8,660,712 | B2 * | 2/2014 | Grabowsky | B64C 3/56 701/3 |
| 9,387,926 | B2 | 7/2016 | Sommer | |
| 9,505,484 | B1 * | 11/2016 | Al-Sabah | B64C 3/38 |
| 9,567,066 | B2 * | 2/2017 | Guida | B64C 23/076 |
| 9,714,087 | B2 * | 7/2017 | Matsuda | B64C 29/02 |
| 9,878,786 | B2 * | 1/2018 | Chan | B64C 39/024 |
| 2003/0141409 | A1 * | 7/2003 | Lisoski | B64C 3/42 244/13 |
| 2008/0149758 | A1 * | 6/2008 | Colgren | B64C 9/02 244/13 |
| 2009/0294573 | A1 | 12/2009 | Wilson et al. | |
| 2012/0083945 | A1 * | 4/2012 | Oakley | B64C 27/08 701/2 |
| 2014/0316616 | A1 * | 10/2014 | Kugelmass | G05D 1/101 701/8 |
| 2016/0011600 | A1 * | 1/2016 | Chubb | B64C 17/00 701/8 |
| 2016/0144969 | A1 * | 5/2016 | Rawdon | B64C 3/185 244/13 |
| 2016/0244160 | A1 * | 8/2016 | Colten | B64C 39/024 |
| 2017/0001701 | A1 * | 1/2017 | Osvog | B64C 3/185 |
| 2017/0203839 | A1 * | 7/2017 | Giannini | B64D 29/02 |
| 2017/0233069 | A1 * | 8/2017 | Apkarian | B64F 5/10 244/7 R |
| 2017/0278410 | A1 * | 9/2017 | Byers | B64C 39/024 |
| 2017/0313421 | A1 * | 11/2017 | Gil | B64D 1/00 |
| 2018/0002026 | A1 * | 1/2018 | Oldroyd | B64C 11/46 |
| 2018/0072417 | A1 * | 3/2018 | Shannon | B64D 1/22 |
| 2018/0072422 | A1 * | 3/2018 | Shannon | B64D 1/22 |
| 2018/0086458 | A1 * | 3/2018 | Sartorius | B64C 39/024 |
| 2018/0155021 | A1 * | 6/2018 | Patterson | B64C 37/02 |
| 2018/0186448 | A1 * | 7/2018 | Pantalone | B64C 27/08 |

OTHER PUBLICATIONS

Lawler, Richard, "Google shows off 'Project Wing' delivery drones," https://www.engadget.com/2014/08/28/google-x-project-wing/, Aug. 8, 2014.

Burgess: Matt, "DHL's delivery drone can make drops quicker than a car," http://www.wired.co.uk/article/dhl-drone-delivery-germany, May 10, 2016.

Washington, Graham W., "The Week in Technology, Sep. 5-9, 2016," Aviation Week and Space Technology, Sep. 12, 2016, pp. 1-5, http://awin.aviationweek.com/ArticlesStory/ArticlesPrint/tabid/1743/Status/IPAddress/id/c6d8e/Default.aspx.

Anderson, C. E., "Dangerous Experiments," Flight Journal, Dec. 2000, pp. 64-72.

Magill, Samantha A., "Compound Aircraft Transport Study: Wingtip-Docking Compared to Formation Flight," Dissertation, 2002, 315 pages, Virginia Polytechnic Institute and State University.

Magill, S. A. et al., "Compared Aircraft Transport A Comparison of the Wingtip-Docked and Close-Formation Flight," 41st AIAA Aerospace Sciences Meeting and Exhibit, Jan. 6-9, 2003, pp. 1-17, AIAA 2003-0607.

Knaack, Marcelle S., "Encyclopedia of the US Air Force Aircraft and Missile Systems," Post-World War II Fighters 1945-1973, 370 pages, vol. 1, http://www.dtlc.mil/docs/citations/ADA057002.

Moore, J. W. et al., "Murtibody Transport Concept," AIIA 2nd International Very Large Vehicle Conference, May 17-18, 1982, pp. 1-12, AIAA-82-0810, Washington DC.

Tomazic, Tine et al., "Pipistrel Taurus G4: on Creaton and Evolution of the Winning Aeroplane of the NASA Green Flight Challenge 2011," Journal of Mechanical Engineering, 2011, pp. 869-878, vol. 57, No. 12.

Langelaan, Jack W. et al., "Green Flight Challenge: Aircraft Design and Flight Planning for Extreme Fuel Efficiency," Journal of Aircraft, May-Jun. 2013, pp. 832-846, vol. 50, No. 3.

Yaros, Steven F. et al., "Synergistic Airframe-Propulsion Interactions and Integrations," A White Paper Prepared by the 1996-1997 Langley Aeronautices Technical Committee, Mar. 1998, 124 pages. NASA/TM-1998-207644.

Jones, Gregory S. et al, "Research Opportunities in Advanced Aerospace Concepts," National Aeronatics and Space Administration, Dec. 2000, 68 pages, NASA/TM 2000-210547.

Montalvo, Carlos et al., "Meta Aircraft Flight Dynamics," Journal of Aircraft, Jan.-Feb. 2015, pp. 107-115, vol. 52, No. 1.

Montalvo, Carlos, "Meta Aircraft Flight Dynamics and Controls," Ph.D Thesis, 2014, 161 pages, Georgia Institute of Technology.

Duffy, Michael J. et al., "The LIFT1 Project—Modular, Electric Vertical Lift System with Ground Power Tether," 33rd AIAA Applied Aerodynamics Conference, Jun. 22-26, 2015, pp. 1-20, AIAA Aviation Forum.

Karasi, Anand K., "Cooperative Parent Child Unmanned Aerial Vehicles: A Systems Engineering Approach," A Thesis, 1999, pp. 1-82, Massachusetts Institute of Technology.

Kubik, Stephen T., "Application of Parent Child UAV Tasking for Wildfire Detection and Response," Thesis presentation, Nov. 20, 2008, 170 pages. California Polytechnic State University.

Darpa, http://www.darpa.mil/program/gremlins, accessed Jun. 5, 2017.

Gremlin, http://defense-update.com/wp-content/uploads/2017/03/030217_GREMLIN_RELEASE_TOP_725.jpg, accessed Jun. 9, 2017.

Washington, Graham W., "The Week in Technology, Sep. 12-18, 2016," Aviation Week and Space Technology, Sep. 12, 2016, pp. 1-5.

Washington, Graham W., "The Week in Technology, Sep. 19-23, 2016," Aviation Week and Space Technology, Sep. 19, 2016, pp. 1-4.

Washington, Graham W., "The Week in Technology, Sep. 26-30, 2016," Aviation Week and Space Technology, Sep. 26, 2016, pp. 1-4.

* cited by examiner

SYSTEM AND METHOD FOR MODULAR UNMANNED AERIAL SYSTEM

CROSS-REFERENCE TO RELATED PATENT APPLICATION(S)

This patent application claims the benefit of and priority to U.S. Provisional Patent Application No. 62/344,728, filed on Jun. 2, 2016, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefor.

BACKGROUND OF THE INVENTION

Unmanned Aerial Vehicle (UAV)-based parcel delivery services for commercial, private, and government applications have received heightened attention in recent years due largely to advancements in key supporting technologies. Corporate entities in particular continue to aggressively develop UAV-based parcel delivery systems under the pretense that market demand for UAV delivery services will entail point-to-point/short-range and low-weight payload delivery. In addition to parcel delivery, example UAV-based aerial applications include scientific data collection, search-and-rescue operations, surveillance and reconnaissance missions, and other applications requiring extended flight ranges and dwell times. As a result, such missions tend to rely on single fixed-wing UAV configurations having a specified onboard sensor suite. Other proposed configurations use a battery-powered multi-rotor design. While relatively lightweight, conventional rotary configurations exist, such configurations may result in inefficient flight operations, reduced flying ranges, and lower payload-carrying capabilities. Therefore, a need exists for long-range UAV-based aerial delivery systems and methodologies to collectively provide a distributed aerial presence.

BRIEF SUMMARY OF THE INVENTION

An Unmanned Aerial System or UAS is configured to provide the distributed aerial presence noted above using a modular "parent-child" vehicle architecture as set forth herein. The UAS of the present disclosure may be used to deliver parcels or other payloads over an expanded flight range. The present approach involves the coordinated and synergistic use of multiple Unmanned Aerial Vehicle (UAV) "child" modules that dock or link edge-to-edge or wingtip-to-wingtip during shared transport via a separate UAV "parent" module. As a result, the potential flight range is extended by increasing aerodynamic efficiency of the UAS, and by possibly sharing electrical energy between the linked parent and child modules.

In general, the modular UAS includes two independently-operable unmanned aircraft: the UAV parent module and multiple, identically-configured UAV child modules. The parent and child modules may operate together or independently depending on the stage of flight operations and the particular mission requirements. When the child modules are docked with the parent module, the resultant UAS resembles a fixed-wing aircraft having an extended main wing constructed from the interconnected wings of the parent and child modules. The UAS may include one or more horizontal and/or vertical stabilizers, some of which may serve a dual purpose by functioning as landing gear structure. The parent module is equipped to provide primary forward thrust for the UAS. Upon reaching a rendezvous point, the child modules undock and detach from each other and from the parent module, transition to independent flight, conduct a designated module-specific mission, and then, if needed, return to the parent module for re-docking. Depending on the mission, multiple child modules may remain linked with one another and/or may undock at different times.

In a non-limiting example embodiment, the modular UAS has separate first and second flight configurations, and includes the UAV parent module and a plurality of the UAV child modules. The UAV parent module may include a fuselage, forward and aft wings, and a first plurality of flight propulsion devices. Each UAV child module has a corresponding second plurality of flight propulsion devices. In the first flight configuration, each child module uses the docking mechanisms to link or dock with either a distal end of the forward wing or an edge or wingtip of an adjacent child module. To achieve the second flight configuration, the child modules undock and separate from the forward wing and from each other and transition to controlled flight independently of flight of the UAV parent module.

The first plurality of propulsion devices may include propellers, e.g., connected to a forward wing, with one or more additional propellers connected to an aft wing or a vertical stabilizer. The diameter of the propellers connected to the forward wing may be less than the diameter of the propellers connected to the aft wing in some configurations. The first plurality of propulsion devices may further include first and second sets of ducted rotors positioned within the respective forward and aft wings. Some or all of the propellers, such as those connected to the example forward wing, may be configured to selectively pivot into a vertical orientation such that a plane of rotation of the propellers is substantially horizontal, i.e., to provide a vertical takeoff and landing configuration.

In some optional embodiments, a fuel tank or other energy storage system may be positioned within the fuselage, with the first plurality of propulsion devices powered using energy from the energy storage system. For instance, combustion of a supply of fuel in the fuel tank may be used to power the propulsion devices, or electricity may be used when the energy storage system is a battery. Power may be distributed to the propulsion devices either mechanically, e.g., directly via spinning shafts, or indirectly by generating electrical energy that is distributed to the propulsion devices.

The second plurality of propulsion devices may include ducted rotors positioned within the child modules, e.g., four ducted rotors for a given child module. Each child module may include a corresponding battery, with the propulsion devices of the child modules powered using electrical energy from the corresponding battery.

Radio frequency (RF) transceivers may be connected to the parent and child modules. This configuration enables the parent module to remotely communicate with the child modules via the RF transceivers, and vice versa, particularly when operating in the second flight configuration.

The docking mechanisms may optionally include a male fitting or probe and a female fitting or receptacle, each of which is configured to respectively engage a corresponding receptacle or probe of an adjacent child module. To facilitate docking, permanent magnets or electromagnets may be used as part of the docking mechanisms to help magnetically align adjacent child modules, or to align a child module with the parent module. Each docking mechanism may further include an actuator device, e.g., a linear or rotary actuator configured to selectively engage an adjacent child module or the parent module, thereby functioning as a mechanical interlock while operating in the first flight configuration.

A method is also disclosed for controlling a modular UAS having the above-noted first and second flight configurations. The method according to an example embodiment includes docking or linking wingtips or distal ends of the UAV parent module to the UAV child modules in order to form the first flight configuration, and then flying the UAS to a rendezvous point while in the first flight configuration. The method also includes undocking the child modules in response to reaching the rendezvous point to thereby form the second flight configuration, and thereafter independently flying the parent module and the undocked child modules in the second flight configuration.

These and other features, advantages, and objects of the present disclosure will be further understood and readily apparent from the following detailed description of the embodiments and best modes for carrying out the disclosure by referring to the specification, claims, and appended drawings.

DETAILED DESCRIPTION OF THE INVENTION

Figure 1:
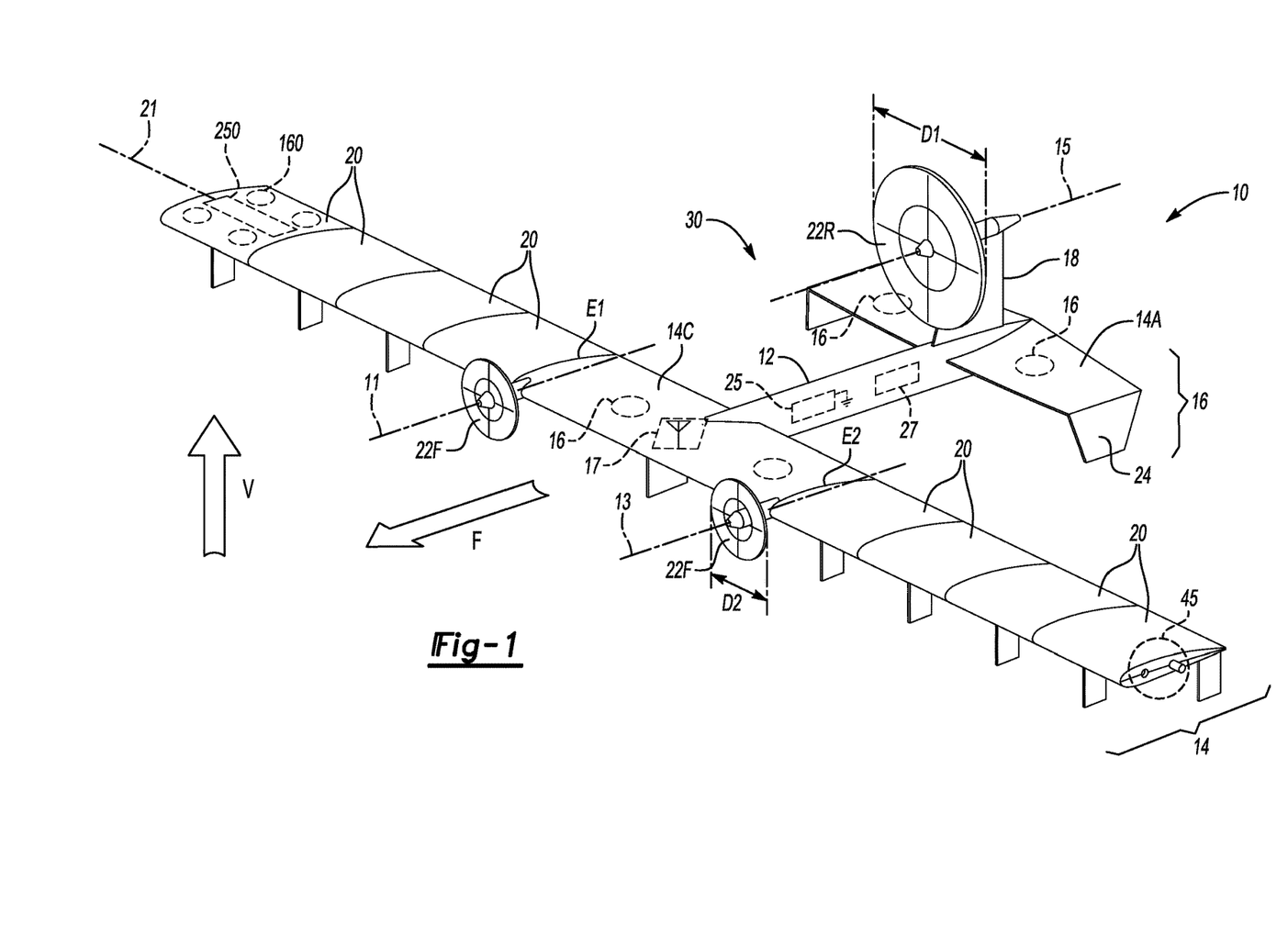
FIG. 1 is a schematic perspective view illustration of a modular Unmanned Aerial System (UAS) having an Unmanned Aerial Vehicle (UAV) parent module and multiple UAV child modules, with the parent and child modules collectively providing a distributed aerial presence as described herein.

For purposes of description herein, the terms "upper," "lower," "right," "left," "rear," "front," "vertical," "horizontal," and derivatives thereof shall relate to the invention as oriented in FIG. 1. However, various alternative orientations and step sequences are possible, except where expressly specified to the contrary. The specific devices and processes illustrated in the drawings and described in the following specification are intended as exemplary embodiments of the structure or processes as defined in the appended claims. Hence, specific dimensions and other physical characteristics relating to the representative embodiments disclosed herein are not limiting, unless the claims expressly state otherwise.

Figure 2:
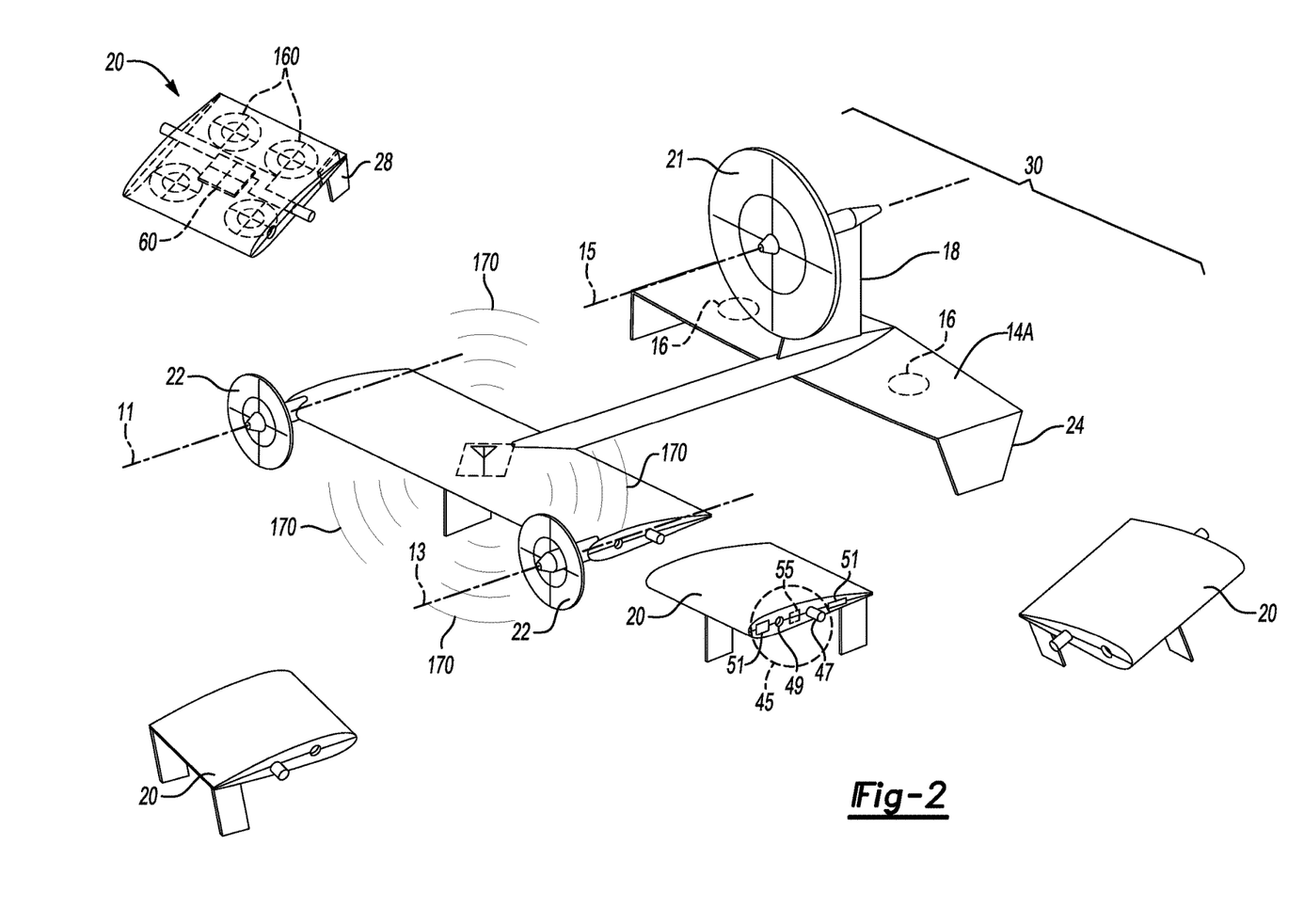
FIG. 2 is a schematic perspective view illustration of the example UAS of FIG. 1 as it appears upon deployment of the child modules.

With reference to the drawings, wherein like reference numbers refer to the same or similar components throughout the several views, an Unmanned Aerial System (UAS) 10 is shown schematically in FIG. 1. The UAS 10 has two primary forward flight configurations: a linked/unitary flight configuration as shown in FIG. 1 and an unlinked flight configuration as depicted in FIG. 2. The UAS 10 is configured to execute a flight mission 40 as described below with reference to FIG. 3, whether automatically, autonomously, or under control of one or more remote pilots. One embodiment of the mission process includes a method 50 as shown in FIG. 4. As noted above, the UAS 10 is intended to provide a distributed aerial presence. As such, the UAS 10 may be used for long-range delivery of parcels or other payloads 60 (see FIG. 2), scientific data collection, surveillance and reconnaissance missions, or search and rescue operations.

The UAS 10 includes a first Unmanned Aerial Vehicle (UAV) in the form of a UAV "parent" module 30 and a plurality of second UAVs in the form of individual "child" modules 20. The child modules 20 selectively dock with and undock from the parent module 30 at different stages of the flight mission 40 of FIG. 3. The parent module 30 thus acts in a role as a "mothership" by transporting the linked child modules 20 while providing primary propulsion systems for the UAS 10. That is, the parent module 30 is responsible for propelling the UAS 10 in a forward direction as indicated by arrow F, as well as in a vertical direction (arrow V) in different flight modes.

The UAV parent module 30 may be optionally embodied as a tandem-wing aircraft as shown, i.e., with a forward wing 14F and an aft wing 14A. The aft wing 14A may be arranged in a generally parallel orientation with respect to a wing axis 21 of the forward wing 14F, and thus may serve as a horizontal stabilizer for the UAS 10. The aft wing 14A may include optional wingtip extensions 24 or winglets for improved flight stability. The wingtip extensions 24 may optionally function as or support a rear landing gear, e.g., when equipped with a suitable set of wheels or skids (not shown).

Further with respect to the main propulsion system of the UAS 10 of FIG. 1, the parent module 30 may include one or more rear propellers 22R, e.g., a single rear propeller 22R as shown having an axis of rotation 15 and a diameter (D1). The rear propeller 22R may be positioned on a vertical tail member 18 of the UAS 10 and configured to provide thrust at a relatively high efficiency. Efficiency gains may be realized via a high mass flow rate of air through the rear propeller 22R.

Additional propellers 22F may be connected to the forward wing 14F. The propellers 22F are shown in FIG. 1 as a pair of propellers 22F having respective axes of rotation 11 and 13 and, optionally, a smaller diameter (D2) relative to the diameter (D1) of the propeller 22R. The propellers 22F may be positioned at or near the wingtips or distal ends E1 and E2 of the forward wing 14F of the parent module 30 to help reduce drag, e.g., by providing a beneficial aerodynamic interaction with a corresponding wingtip vortex. Additionally, hover capability of the UAS 10 may be achieved in some embodiments by automatically pivoting or tilting the propellers 22F and/or 22R such that the axes of rotation 11, 13, and/or 15 transition to a vertical orientation, i.e., with a plane of rotation of the propellers 22F and/or 22R being substantially horizontal. Hover capability may also be achieved by selectively powering an enclosed set of ducted fans or rotors 16 within the forward wing 14F and the aft wing 14A.

An electric propulsion system may be used in some non-limiting embodiments of the UAS 10, in which case an energy storage system 25 in the form of a main battery located on or within the fuselage 12 of the parent module 30 may supply electrical energy to the propellers 22F and 22R and the ducted rotors 16. However, those of ordinary skill in the art will appreciate that hybrid electric architectures may be used. By way of example, the UAS 10 may be powered primarily or solely using chemical energy from fuel contained in a fuel tank 27 within the fuselage 12. The fuel tank 27 may act in addition to the energy storage system 25, or may be the sole energy storage system for the parent module 30 in different embodiments. Other power sources may be used in the alternative, such as fuel cells or solar arrays (not shown), in order to provide the UAS 10 with a suitable supply of energy for primary propulsion.

Other possible hardware components of the UAV parent module 30 may include a radio frequency (RF) transceiver 17 connected to the fuselage 12 or other suitable structure of the parent module 30. In such an embodiment, the parent module 30 may be configured to broadcast corresponding flight control instructions 170 to RF transceivers 17C of the various UAV child modules 20 via the RF transceiver 17 as shown in FIG. 2 when the UAS 10 transitions to the second flight configuration, to receive GPS position data, and/or to receive or transmit flight control status information. In this manner, the parent module 30 is configured to remotely communicate with the UAV child modules 20 via the RF transceivers 17 and 17C particularly once the child modules 20 have transitioned to independent flight. Additionally, although omitted from the drawings for illustrative simplicity, the UAS 10 may be optionally equipped with a suitable sensor suite, such as electro-optical or infrared cameras, laser or radar devices, temperature or pressure transducers, airspeed sensors, or other sensors required for a given mission.

With respect to the individual UAV child modules 20 of FIG. 1, when operating in the first flight configuration of FIG. 1, each child module 20 is configured to dock end-to-end with a wingtip or distal end (E1 or E2) of the forward wing 14F, or with an adjacent one of the child modules 20. This docking functionality is achieved using a docking mechanism 45, a non-limiting example of which is depicted schematically in FIGS. 1 and 2. In this manner, the linked child modules 20 effectively extend the length of the forward wing 14F along axis 21 to increase the total wingspan of the UAS 10. The child modules 20 are also configured to undock and separate from the forward wing 14F and from each other in order to transition to flight during the second flight configuration shown in FIG. 2, with such flight thereafter progressing independently of flight of the parent module 30.

The child modules 20 may be individually powered by a corresponding set of ducted fans or rotors 160, as shown schematically within a representative one of the child modules 20 at the far left of FIG. 1. The ducted rotors 160 may be similar in construction and operation to the ducted rotors 16 of the forward and aft wings 14F and 14A. Each child module 20 may carry a relatively small battery 250 to provide necessary electrical energy for powering the ducted rotors 160, as well as any onboard electrical or electromechanical devices needed for performing a particular task of a given one of the child modules 20. Also in the linked configuration of FIG. 1, docking may establish hardwired electrical connectivity between the child modules 20 and the parent module 30. The parent module 30 may be used in such a configuration to distribute electricity to the child modules 20 in flight, e.g., to charge the batteries 250 or perform in-flight system diagnostics of the child modules 20. Such networked connections may allow the parent module 30 and child modules 20 to share or conserve energy as needed and thereby increase their flight range.

Referring to FIG. 2, the UAS 10 of FIG. 1 is shown in its second forward flight mode in which the UAV child modules 20 are fully undocked from the UAV parent module 30 and operating in close proximity thereto, e.g., autonomously or via remote control by a human or automated pilot. While four child modules 20 are depicted for illustrative simplicity, more or fewer of the child modules 20 may be used in other embodiments. Each child module 20 includes the docking mechanism 45 noted above, one per lateral side or edge, and also includes a corresponding second plurality of propulsion devices. In the example embodiment of FIG. 2, the propulsion devices of a given child module 20 may include the ducted rotors 160 noted above. Thus, the child modules 20 may rely on directional thrust from the ducted rotors 160 for independent propulsion once fully undocked from the parent module 30.

The ducted rotors 160 may be contained fully within the structure of a given child module 20. As a result, the various child modules 20 may be thicker than is depicted schematically in FIG. 2 to a level that depends on the required internal packaging space of the ducted rotors 160 and payload 60. Optional bay doors (not shown) disposed over the ducted rotors 160 may also be used to improve aerodynamics. Alternatively, if the mission requires that the child modules 20 operate at or near a ground surface, the child modules 20 may be configured to glide toward the ground, descending to within a predetermined distance from ground prior to starting and operating the ducted rotors 160. To facilitate flight control and provide directional stability and yaw control, each child module 20 may be equipped with a set of vertically-extending tails 28 with control rudders. Such tails 28 may double as landing gears for the child modules 20, for instance by attaching skids or wheels (not shown). Additionally, forward flight control may be facilitated via control surfaces such as flaps or ailerons along the trailing edge of the child module 20.

Each UAV child module 20 in the non-limiting illustrative example embodiment of FIG. 2 may be configured as a hybrid wing body configuration. That is, each child module 20 may have an airfoil cross section as shown as opposed to a conventional tube and wing-type configuration. Additionally, the child modules 20 may be characterized by an absence of a taper along the wing axis 21, and thus along the wing length of the UAS 10 and the constituent parent module 30 and child modules 20 in the linked/forward flight configuration of FIG. 1.

As shown schematically in FIG. 2, the payload 60 may be carried and contained within the body of the child module 20 to ensure that the payload 60 remains substantially out of the slipstream during flight. This protects the payload 60 from the elements while improving aerodynamic efficiency. The payload 60 may be variously embodied as a parcel for delivery, a sensor suite for performing scientific research, search and rescue operations, or surveillance and reconnaissance missions as noted above. Upon reaching a target destination, the child module 20 may activate or deliver the payload 60 depending on the application, and then return under its own power to the UAV parent module 30.

Further with respect to the docking mechanism 45 introduced above with reference to FIG. 1, a probe 47 may be used in the form of a peg, extension, or other male fitting that is received within a mating receptacle 49, with each probe 47 configured to engage a corresponding receptacle 49 of an adjacent child module 20 or the distal ends E1 or E2 of the forward wing 14F, whichever is required based on relative position. As is well known in the art of airborne refueling, a universal drogue and probe-type fitting connection may be used to accommodate relative motion of two bodies in flight, here the UAV parent module 30 and a given UAV child module 20, or adjacent child modules 20. Functionally or structurally similar fitting structure may be adapted for use as the docking mechanism 45. The probe 47 and receptacle 49 may swap relative position on opposite edges of the child modules 20, such that a given probe 47 is positioned to align with a corresponding receptacle 49 of an adjacent child module 20 and vice versa.

The docking mechanism 45 may optionally include a set of magnets 51 configured to magnetically align adjacent UAV child modules 20, or an inboard-most child module 20 and the parent module 30, e.g., via mutual magnetic attraction with a corresponding field of an oppositely-polarized set of magnets 51. An electromagnet may be used and selectively controlled to alternatively generate and discontinue an electromagnetic field attraction for such a purpose. Alternatively, permanent magnets may be used in conjunction with an actuator device 55 to apply a separation force and thereby urge adjacent modules 20 away from each other. A solenoid, motor, shape memory element, rotary ball screw mechanism, or other suitable actuator may be used as the actuator device 55 in different embodiments.

Figure 3:
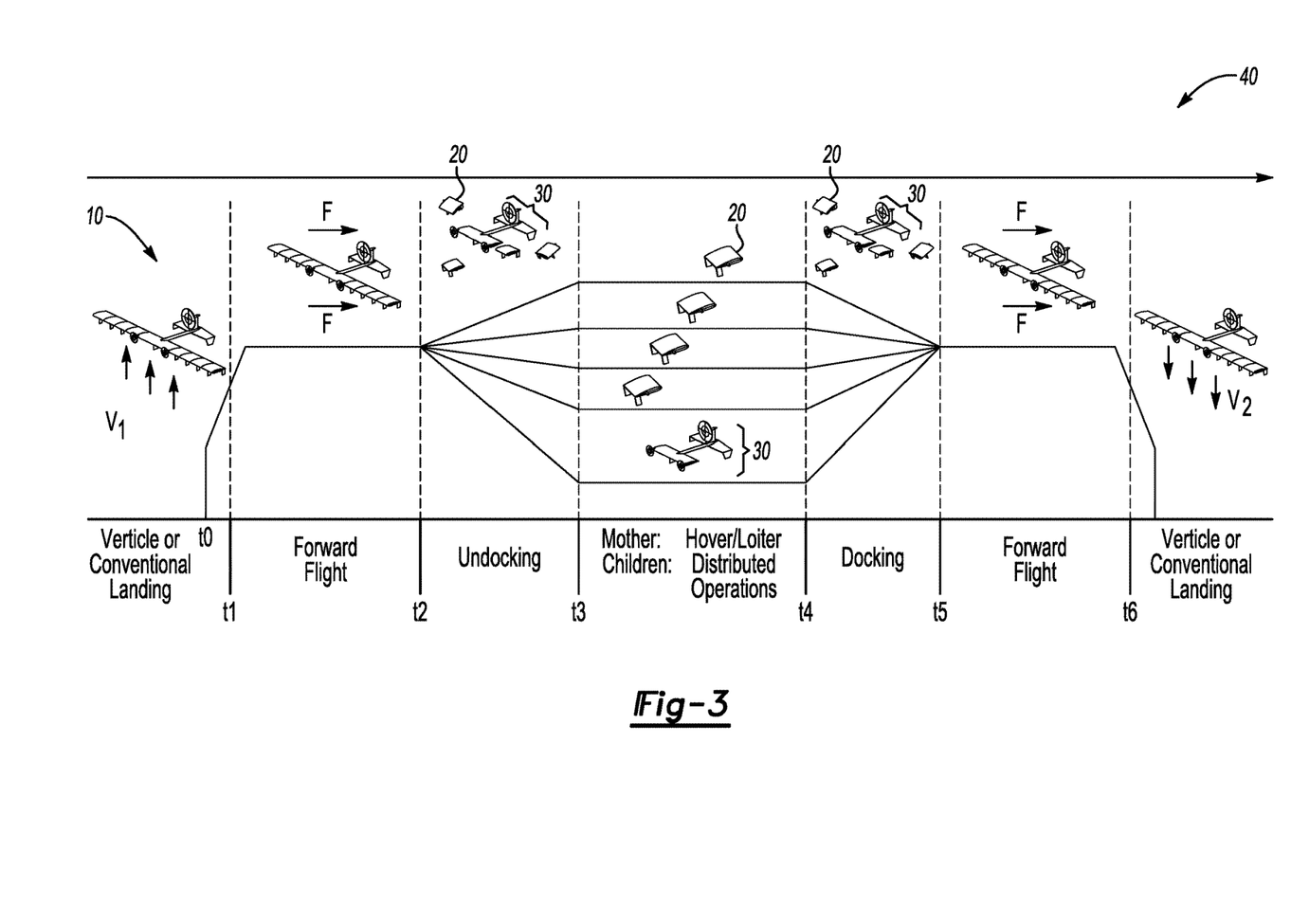
FIG. 3 is a schematic timeline depicting multiple possible flight stages of the UAS of FIGS. 1 and 2.
Figure 4:
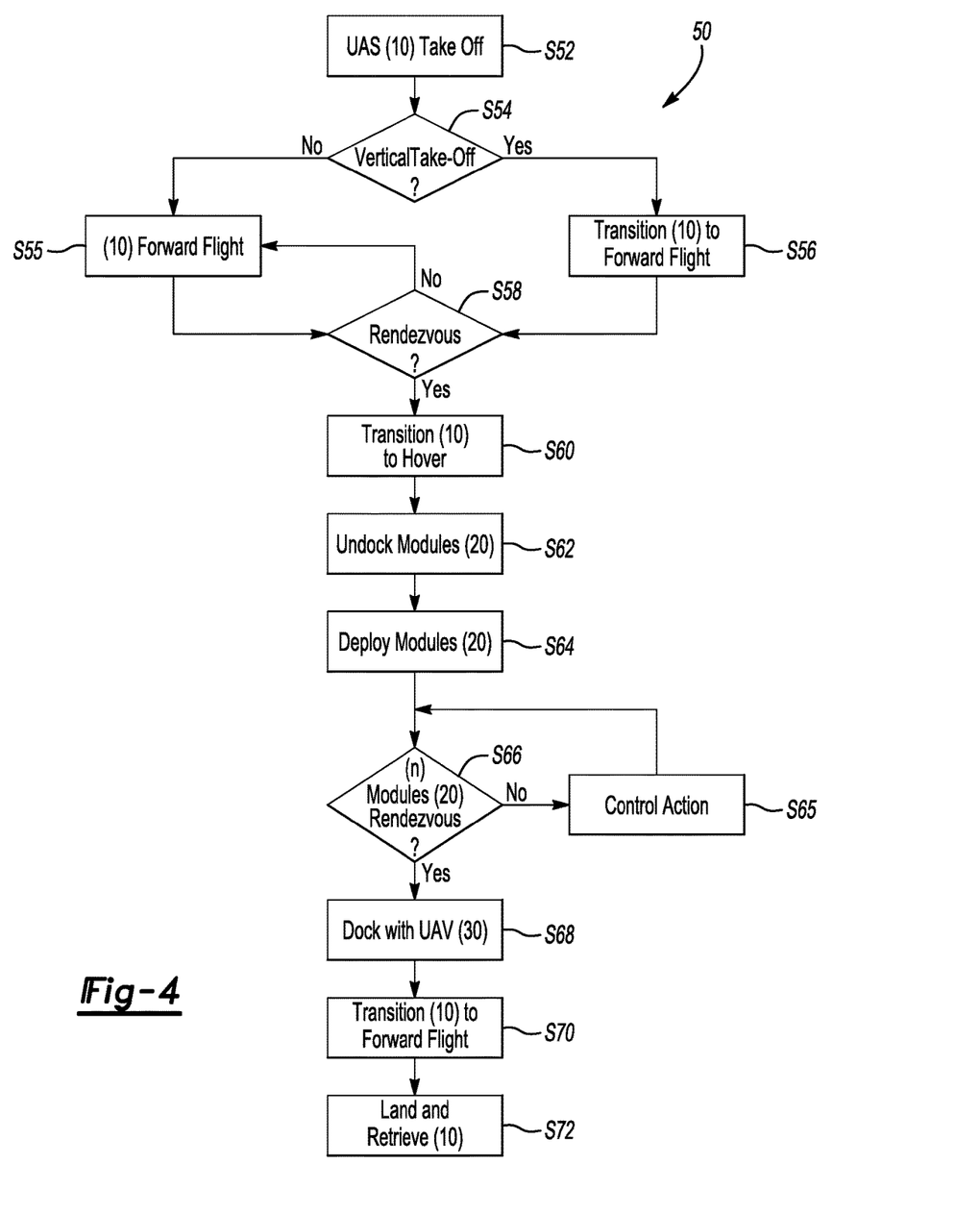
FIG. 4 is a flow chart describing an example method for operating the UAS of FIGS. 1 and 2 through the various flight stages depicted in FIG. 3.

An illustration of an example flight operation sequence is shown in FIG. 3 in the form of the schematic timeline 40. The method 50 for controlling progression through multiple different operating stages of the timeline 40 is described with reference to FIG. 4. While FIG. 3 depicts the UAS 10 of FIGS. 1 and 2, variations of the UAS 10 and its constituent parent module 30 and child modules 20 may be used within the scope of the method 50. Also, the timeline 40 envisions an example takeoff sequence of the UAS 10 as a unit, i.e., with the UAV child modules 20 together forming the first forward flight configuration of FIG. 1. In other approaches, it may be advantageous for the UAV parent module 30 and the individual child modules 20, or linked combinations thereof, to take off separately and dock in flight, for instance when an available runway width or pad area is less than an area that is required by the UAS 10.

Commencing at to in FIG. 3, a possible flight operation of the UAS 10 commences at step S52 by initiating conventional runway takeoff or a vertical takeoff, as indicated by arrows $V_1$, depending on the configuration of the UAS 10. Step S52 may entail control of the primary propulsion systems of the parent module 30, such as the propellers 22F and 22R of FIG. 1, and possibly the ducted rotors 16 on the forward wing 14F and aft wing 14A. Step S52 may optionally include powering some or all of the corresponding propulsion systems of the child modules 20 during takeoff, e.g., by powering the ducted rotors 160, or the method 50 may include leaving the child modules 20 in a dormant or off state until later in the flight sequence. The method 50 proceeds to step S54 after a successful takeoff Step S54 may include determining whether a vertical takeoff is being requested or is already being performed. If so, the method 50 proceeds to step S56. The method 50 proceeds in the alternative to step S55 when a vertical takeoff is not being requested or performed.

At step S55, the UAS 10 travels toward a predetermined rendezvous point. For instance, as a set of flight instructions broadcast or transmitted to the UAS 10 and received via the onboard RF transceiver 17, the UAS 10 may be provided with coordinates of a rendezvous point and heading by a ground-based control center (not shown), or the UAS 10 may be programmed with such information prior to takeoff. The method continues to step S58.

Step S56 includes transitioning the UAS 10 to forward flight at a predetermined altitude and/or travel time. Such a transition occurs at time $t_1$ in FIG. 3. The method 50 thereafter proceeds to step S58.

Step S58 includes determining whether the UAS 10 has reached a predetermined rendezvous point, e.g., by comparing the coordinates of the rendezvous point with the present position of the UAS 10 corresponding to, e.g., a known GPS position of the UAS 10. Steps S55 and S58 are repeated until the UAS 10 reaches the rendezvous point, or within an allowable range thereof, which occurs around $t_2$ of FIG. 3. The method 50 then continues to step S60.

At step S60, commencing at about $t_2$ the method 50 includes transitioning the UAS 10 to a hover or loiter mode in preparation for undocking and distributed aerial operations. Step S60 may include controlling the speed, yaw, or other characteristic of the ducted rotors 16 and propellers 22R and 22F to enter the hover or loiter modes, with the particular mode depending on the mission and configuration of the UAS 10. The method 50 proceeds to step S62.

Step S62 may include undocking the UAV modules 20 from the parent module 30, an event that occurs shortly after $t_2$ in FIG. 3. As part of step S62, the parent module 30 may signal the individual UAV modules 20 to separate and commence independent flight operations. Implementation of step S62 may vary depending on the configuration of the docking mechanism 45 of FIG. 1. For example, separation may include activation of the actuator device 55 shown schematically in FIG. 2 so as to urge a given UAV child module 20 away from an adjacent child module 20. The method 50 thereafter proceeds to step S64.

At step S64, the method 50 continues by deploying a plurality (n) of the child modules 20 to corresponding target destinations commencing at about $t_3$ of FIG. 3. That is, the (n) child modules 20 fly under their own power to designated destinations to complete an assigned task, such as delivering the payload 60 of FIG. 2 in the form of a package to a particular address or destination, collecting scientific data, or performing a search-and-rescue operation. The parent module 30 may hover or loiter on station while monitoring operations of the deployed child modules 20, or the parent module 30 may conduct its own assigned mission tasks. The method 50 then continues to step S66.

Step S65 includes executing a control action when fewer than (n) UAV child modules 20 have returned to the rendezvous point. For instance, the parent module 30 may initiate a timer to count through an allowable amount of time, and/or transmit a maintenance status signal or recovery signal to any child modules 20 that have not returned in order to determine whether a given UAV child module 20 is expected to return to the rendezvous point. The method 50 then repeats step S66.

Step S66, which is executed just prior to docking of the UAV child modules 20, includes determining whether the number (n) of child modules 20 deployed at step S64 and expected to return to the rendezvous point, e.g., using a previously assigned flight mission, a received maintenance status or signal, or other suitable information, have in fact returned. Assuming all (n) child modules 20 that deployed at step S64 are expected to return to trhe rendezvous point, the method 50 proceeds to step S65 when fewer than (n) child modules 20 have returned, and to step S68 when all (n) child modules 20 have returned. In other embodiments, (n) may change from its value at step S64 when, whether due to maintenance, flight schedule, weather, or other circumstances, fewer than all of the deployed child modules 20 are expected to return to the rendezvous point.

At step S68, the parent module 30 commences docking operations with any of the UAV child modules 20 flying in proximity to the parent module 30, with step S68 commencing at about $t_4$ in FIG. 3. The method 50 proceeds to step S70 when docking operations are complete.

Step S70 may entail transitioning the UAS 10 to forward flight at about $t_5$ of FIG. 3, which may entail leaving hover/vertical flight or exiting loiter flight. Thereafter, step S70 may include controlling the return flight of the UAS 10 to a desired landing destination, typically but not necessarily the original takeoff point of step S52. The method 50 then proceeds to step S72.

Step S72 includes commencing landing operations of the UAS 10 commencing at about $t_6$, as indicated by arrows $V_2$, and thereafter retrieving the UAS 10. Step S72 may entail controlling the airspeed and altitude of the UAS 10 as the UAS 10 approaches the predetermined landing destination, i.e., by controlling the attitude, speed, and pitch of the propellers 22F and 22R, the ducted rotors 16 and 160, and any flight control surfaces of the tail portion 18, aft wing 14A, the forward wing 14F, and linked child modules 20.

Regardless of the particular embodiment, the method 50 as set forth herein enables control of the modular UAS 10 or any variant thereof having the above-described first and second flight configurations. In general terms, the method 50 includes linking the first and second distal ends E1 and E2 of the forward wing 14F to the UAV child modules 20 using the docking mechanisms 45 so as to form the first flight configuration, and then flying the UAS 10 to the rendezvous point using flight propulsion devices of the parent module 30, e.g., the propellers 22F and 22R and/or the ducted rotors 16. The child modules 20 are then detached or unlinked from the forward wing 14F and each other in response to reaching the rendezvous point, and to thereby form the second flight configuration. Thereafter, the parent module 30 is independently flown using the propellers 22F and 22R and/or ducted rotors 16 located on the parent module 30, while the UAV child modules 20 are flown using the flight propulsion devices contained in each of the child modules 20, i.e., the ducted rotors 160.

Although the vehicle architectures described above include two aerial vehicles, i.e., the UAV parent module 30 and the UAV child modules 20, three or more distinct aircraft may be used in other embodiments. By designing for intra-aircraft "modularity", greater operational flexibility can be achieved. For example, one child module 20 could be sized to carry a larger payload 60 than other child modules 20. Such a configuration may be beneficially used by a package delivery service in order to deliver packages or parcels of larger sizes when needed. By "rightsizing" the payload capability of the child modules 20, energy use of the UAS 10 of FIGS. 1 and 2 can be minimized.

Additionally, there may be advantages to using completely identical UAV modules 20 and forgoing use of a distinct parent module 30. That is, because the UAV child modules 20 and the parent module 30 are unique with respect to each other, they may require separate tooling and spare parts. Consequently, it may be possible to reduce acquisition and maintenance costs if by constructing the UAS 10 solely with identical vehicles, e.g., as a wing formed of identical UAV modules 20. Similarly, if a shorter-range mission is required, the individual child modules 20 may be able to perform the mission without the need to link with and be transported by the parent module 30. As a result, the modular approach disclosed herein provides a wide range of flexibility for achieving a distributed aerial presence.

The detailed description and the drawings or figures are supportive and descriptive of the disclosure, but the inventive scope is defined solely by the claims. While some of the best modes and other embodiments for carrying out the disclosure have been described in detail herein, various alternative designs and embodiments exist within the intended scope of this disclosure. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A modular unmanned aerial system (UAS) having a first and a second flight configuration, the modular UAS comprising:
   an unmanned aerial vehicle (UAV) parent module comprising:
      a forward wing disposed on a fuselage with a first and a second distal end,
      a first docking mechanism disposed on the first distal end and a second docking mechanism disposed on the second distal end,
      a secondary wing disposed on the fuselage aft of the forward wing, and
      a parent flight propulsion system;
   a first and second UAV child module each having a child flight propulsion system and a child docking mechanism, wherein the docking mechanism of the first UAV child module is configured to connect to the first docking mechanism of the UAV parent module, and the docking mechanism of the second UAV child module is configured to connect to the second docking mechanism of the UAV parent module, wherein the UAV child modules form an integral part of the forward wing and extend the wingspan of the forward wing; and
   wherein the first flight configuration comprises connecting the UAV child modules to the UAV parent module, wherein the second flight configuration comprises separating the UAV child modules from the UAV parent module during aerial flight and the UAV child modules achieving flight independently of the UAV parent module, and wherein the UAS is capable of returning to the first flight configuration from the second flight configuration during aerial flight.

2. The modular UAS of claim 1, further comprising:
   a third and fourth UAV child module each having a child flight propulsion system and a child docking mechanism, wherein the docking mechanism of the third UAV child module is configured to connect to the docking mechanism of the first UAV child module, and the docking mechanism of the fourth UAV child module is configured to connect to the docking mechanism of the second UAV child module.

3. The modular UAS of claim 2, wherein the propulsion devices include propellers.

4. The modular UAS of claim 1, further comprising a fuel tank positioned within or connected to the fuselage, and powered using chemical energy from a supply of fuel in the fuel tank.

5. The modular UAS of claim 1, further comprising a main battery positioned within or connected to the fuselage, wherein the propulsion devices are powered using electrical energy from the main battery.

6. The modular UAS of claim 1, wherein the propulsion devices further each include a pair of ducted rotors.

7. The modular UAS of claim 1, wherein each of the UAV child modules includes a corresponding energy storage system, and wherein the propulsion devices of each UAV child module is powered using energy from the corresponding energy storage system.

8. The modular UAS of claim 1, wherein the energy is electrical energy.

9. The modular UAS of claim 1, further comprising:
a plurality of radio frequency (RF) transceivers connected to the UAV parent module and each of the UAV child modules, wherein the UAV parent module and the UAV child modules are configured to remotely communicate with each other using the RF transceivers during at least the second flight configuration.

10. The modular UAS of claim 1, wherein each of the docking mechanisms includes a probe and a receptacle configured to engage with a corresponding receptacle and probe of an adjacent one of the UAV child modules or the UAV parent module.

11. The modular UAS of claim 1, wherein the docking mechanisms include a set of magnets.

12. The modular UAS of claim 1, wherein the docking mechanisms include an actuator device configured to selectively couple with and engage an adjacent one of the UAV child modules or the UAV parent module.

13. A method of operating a modular unmanned aerial system (UAS) having a first and a second flight configuration during aerial flight, comprising:
providing a modular UAS comprising:
an unmanned aerial vehicle (UAV) parent module comprising:
a forward wing disposed on a fuselage with a first and a second distal end,
a first docking mechanism disposed on the first distal end and a second docking mechanism disposed on the second distal end,
a secondary wing disposed on the fuselage aft of the forward wing, and
a parent flight propulsion system;
providing a first and second UAV child module each having a child flight propulsion system and a child docking mechanism, wherein the docking mechanism of the first UAV child module is configured to connect to the first docking mechanism of the UAV parent module, and the docking mechanism of the second UAV child module is configured to connect to the second docking mechanism of the UAV parent module, wherein the UAV child modules form an integral part of the forward wing and extend the wingspan of the forward wing;
forming the first flight configuration by connecting the UAV child modules to the UAV parent module;
forming the second flight configuration by separating the UAV child modules from the UAV parent module during aerial flight, wherein the UAV child modules achieve flight independent of the UAV parent module;
returning to the first flight configuration from the second flight configuration during aerial flight.

14. The method of claim 13, wherein forming the second flight configuration includes delivering one or more payloads to a corresponding destination using at least one of the UAV child modules.

15. The method of claim 13, wherein the modular UAS further comprises: a third and fourth UAV child module each having a child flight propulsion system and a child docking mechanism, wherein the docking mechanism of the third UAV child module is configured to connect to the docking mechanism of the first UAV child module, and the docking mechanism of the fourth UAV child module is configured to connect to the docking mechanism of the second UAV child module.

16. The method of claim 15, wherein the UAV parent module and the UAV child modules each include a corresponding radio frequency (RF) transceiver, the method further comprising: communicating with each of the UAV child modules, via the UAV parent module using the RF transceivers, while in the second flight configuration.

17. The method of claim 16, wherein docking the first and second distal ends of the UAV parent module to the plurality of UAV child modules includes magnetically aligning the UAV parent module with an adjacent UAV child module using a plurality of magnets.

18. A modular unmanned aerial system (UAS) having a first and a second flight configuration, the modular UAS comprising:
an unmanned aerial vehicle (UAV) parent module comprising:
a forward wing disposed on a fuselage with a first and a second distal end,
a plurality of docking mechanisms disposed on the first and second distal ends,
a secondary wing disposed on the fuselage aft of the forward wing, and
a parent flight propulsion system;
a plurality of UAV child modules each having a child flight propulsion system and a child docking mechanism, wherein the docking mechanisms of the plurality of UAV child modules are configured to connect to the plurality of docking mechanisms of the UAV parent module, wherein the UAV child modules form an integral part of the forward wing and extend the wingspan of the forward wing; and
wherein the first flight configuration comprises connecting the UAV child modules to the UAV parent module, wherein the second flight configuration comprises separating the UAV child modules from the UAV parent module during aerial flight and the UAV child modules achieving flight independently of the UAV parent module, and wherein the UAS is capable of returning to the first flight configuration from the second flight configuration during aerial flight.

19. The modular UAS of claim 18, further comprising a main battery positioned within or connected to the fuselage, wherein the propulsion devices are powered using electrical energy from the main battery.

20. The modular UAS of claim 19, further comprising: a plurality of radio frequency (RF) transceivers connected to the UAV parent module and each of the UAV child modules, wherein the UAV parent module and the UAV child modules are configured to remotely communicate with each other using the RF transceivers during at least the second flight configuration.

* * * * *